US008321073B2

(12) United States Patent
McAvoy (10) Patent No.: US 8,321,073 B2
(45) Date of Patent: Nov. 27, 2012

(54) AIRCRAFT GALLEY SYSTEMS AND METHODS FOR MANAGING ELECTRIC POWER FOR AIRCRAFT GALLEY SYSTEMS

(75) Inventor: Michael B. McAvoy, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/179,372

(22) Filed: Jul. 8, 2011

(65) Prior Publication Data

US 2011/0266864 A1 Nov. 3, 2011

Related U.S. Application Data

(62) Division of application No. 10/731,695, filed on Dec. 9, 2003.

(51) Int. Cl.
G06F 19/00 (2006.01)
H02J 7/00 (2006.01)
(52) U.S. Cl. ........... 701/3; 701/29; 307/20; 307/153; 307/155; 290/40 F; 363/67; 244/53 R
(58) Field of Classification Search ............... 701/3, 29; 244/60, 53 R; 700/295, 286; 307/66, 18, 307/23, 80, 29, 153, 20, 156, 155; 290/40 F; 363/67
See application file for complete search history.

(56) References Cited

U.S. PATENT DOCUMENTS

| 2,489,493 A | 11/1949 | Kuenzie |
|---|---|---|
| 2,939,811 A | 6/1960 | Dillon |
| 3,085,842 A | 4/1963 | Johnson |
| 3,205,033 A | 9/1965 | Stentz |
| 3,297,373 A | 1/1967 | Andrews et al. |
| 3,542,444 A | 11/1970 | Webb et al. |
| 3,698,588 A | 10/1972 | Pogorski |
| 3,847,250 A | 11/1974 | Sherrill |
| 3,847,458 A | 11/1974 | Nowak |
| 3,850,714 A | 11/1974 | Adorjan |
| 3,853,367 A | 12/1974 | Jamison et al. |
| 3,864,170 A | 2/1975 | Krieger |
| 3,948,347 A | 4/1976 | Rutledge |
| 4,047,351 A | 9/1977 | Derner et al. |
| 4,155,611 A | 5/1979 | Brekke et al. |

(Continued)

OTHER PUBLICATIONS

Aspen Aerogels, Inc., "Products—Aspen Aerogels Offers a Range of Flexible Aerogel Blanket Mat," Nov. 25, 2003 www.aspenaerogels.com/products.htm <http://www.aspenaerogels.com/products.htm>, (1 Page).

(Continued)

Primary Examiner — Ronnie Mancho
(74) Attorney, Agent, or Firm — Perkins Coie LLP (57) ABSTRACT

Aircraft power systems, aircraft galley systems, and methods and systems for managing power distribution to aircraft galley systems are disclosed herein. In one embodiment, an aircraft system can include an aircraft power source and at least first and second galley appliances operably coupled to the aircraft power source. The aircraft system can further include a controller operably coupled to the first and second galley appliances. The controller can be configured to receive a first power request from the first galley appliance and a second power request from the second galley appliance. The controller can be further configured to sort the first and second power requests and distribute power to the first and second galley appliances from the aircraft power source based on the sorting of the first and second power requests.

9 Claims, 7 Drawing Sheets

U.S. PATENT DOCUMENTS

| | | | |
|---|---|---|---|
| 4,172,915 A | 10/1979 | Sheptak et al. | |
| 4,210,070 A | 7/1980 | Tatum et al. | |
| 4,214,418 A | 7/1980 | Smith | |
| 4,284,674 A | 8/1981 | Sheptak | |
| 4,340,630 A | 7/1982 | Doty | |
| 4,346,756 A | 8/1982 | Dodd et al. | |
| 4,433,517 A | 2/1984 | Moore, Jr. | |
| 4,444,821 A | 4/1984 | Young et al. | |
| 4,579,756 A | 4/1986 | Edgel | |
| 4,696,954 A | 9/1987 | Pritchard et al. | |
| 4,730,748 A | 3/1988 | Bane | |
| 4,775,002 A | 10/1988 | Iwamoto | |
| 5,007,226 A | 4/1991 | Nelson | |
| 5,106,173 A | 4/1992 | Kelley et al. | |
| 5,115,602 A | 5/1992 | de Larrard | |
| 5,123,564 A | 6/1992 | Hobson | |
| 5,194,482 A | 3/1993 | Chundury et al. | |
| 5,344,030 A | 9/1994 | Evenson | |
| 5,345,814 A | 9/1994 | Cur et al. | |
| 5,347,827 A | 9/1994 | Rudick et al. | |
| 5,368,380 A | 11/1994 | Mottmiller et al. | |
| 5,404,935 A | 4/1995 | Liebermann | |
| 5,407,074 A | 4/1995 | Brightbill et al. | |
| 5,433,518 A | 7/1995 | Skov | |
| 5,441,170 A | 8/1995 | Bane, III | |
| 5,605,344 A | 2/1997 | Insalaco et al. | |
| 5,628,241 A | 5/1997 | Chavanaz et al. | |
| 5,637,933 A | 6/1997 | Rawlings et al. | |
| 5,664,396 A | 9/1997 | Lyman et al. | |
| 5,688,031 A | 11/1997 | Tryon | |
| 5,936,318 A * | 8/1999 | Weiler et al. | 307/66 |
| 5,979,693 A | 11/1999 | Bane, III | |
| 6,034,355 A | 3/2000 | Naderi et al. | |
| 6,038,830 A | 3/2000 | Hirath et al. | |
| 6,109,057 A | 8/2000 | Shervington et al. | |
| 6,131,404 A | 10/2000 | Hase et al. | |
| 6,192,703 B1 | 2/2001 | Salyer et al. | |
| 6,234,498 B1 | 5/2001 | Saku et al. | |
| 6,260,377 B1 | 7/2001 | Tamaoki | |
| 6,295,829 B1 | 10/2001 | Gibot et al. | |
| 6,408,841 B1 | 6/2002 | Hirath et al. | |
| 6,415,623 B1 | 7/2002 | Jennings et al. | |
| 6,460,952 B1 | 10/2002 | Tryon | |
| 6,476,519 B1 | 11/2002 | Weiner | |
| 6,483,204 B2 * | 11/2002 | Hanaki | 307/23 |
| 6,550,259 B2 | 4/2003 | Cartwright et al. | |
| 6,664,656 B2 * | 12/2003 | Bernier | 307/9.1 |
| 6,672,601 B1 | 1/2004 | Hofheins et al. | |
| 6,695,325 B2 | 2/2004 | Carrillo | |
| 6,778,414 B2 | 8/2004 | Chang et al. | |
| 6,856,045 B1 * | 2/2005 | Beneditz et al. | 307/43 |
| 6,925,363 B2 * | 8/2005 | Hutton | 700/295 |
| 6,934,137 B2 * | 8/2005 | Elliott et al. | 361/62 |
| 6,935,641 B2 | 8/2005 | Hahn | |
| 7,020,790 B2 * | 3/2006 | Mares | 713/340 |
| 7,031,810 B2 * | 4/2006 | Foch et al. | 701/3 |
| 7,098,555 B2 * | 8/2006 | Glahn et al. | 307/32 |
| 7,203,849 B2 * | 4/2007 | Dove | 713/300 |
| 2003/0182043 A1 | 9/2003 | Christiansen et al. | |
| 2005/0121978 A1 | 6/2005 | McAvoy | |
| 2005/0193760 A1 | 9/2005 | Moran | |

OTHER PUBLICATIONS

Aspen Aerogels, Inc., "Technology—Aerogels are Extraordinary Solid Insulators," Nov. 25, 2003, www.aspenaerogels.com/technology2.htm <http://www.aspenaerogels.com/technology2.htm>, (3 Pages).

Dekalb Molded Plastics, Custom Structural foam and Gas-Assist Injection Molder, Feb. 25, 2004 web pp. 1-3, www.dekalbplastics.com/structural.html.

Driessen Aircraft Interior Systems, "Full Size Inflight Service Cart," The Netherlands.

Excelfrax® 200 VIP Insulation, "Product Information," Nov. 21, 2003, Web pp. 1-3, http://www.unifax.com/web/UnifraxHome2.nsf/0/4553B63C273DDB7A85256D020053287C? OpenDocument.

Frank F. and Smyth, R., "Systems Developments for The More Electric Aircraft," Aerospace Congress & Exhibition, Sep. 10-14, 2001, Airbus, (19 Pgs.).

Hardigg Industries, "How Rotomolding Technology Works," Feb. 26, 2004, Web pp. 1-3, http://www.hardigg.com/about_hardigg/rotomolding.htm.

Knobe et al., "Definition of Standard Interfaces for Galley Insert Equipment-GAIN," Preliminary ARINC 628 Part 5 Strawman, Aug. 21, 2003, AIRBUS Deutschland GmbH.

Knobe et al., "Definition of Standard Interfaces for Galley Insert Equipment-GAIN," ARINC/AEEC GAIN Specification Issue 2, Nov. 19, 2003, AIRBUS Deutschland GmbH.

Sanyo, "Sanyo Patented VIP™ Vacuum Insulation Panel," Nov. 21, 2003, Web pp. 1-2, http://www.sanyobiomedical.com/products/vip.php.

Team 2, "Phase Change Materials," Jul. 21, 2004, http://web.mit.edu/3.082/www/team2_s02/phase_change.html (1 Page).

TecRep Engineering, "Thermoplastic—structural Foam Molding," Feb. 25, 2004, Web pp. 1-2, http://www.tecrep.com/thermoplastic_strucfoam.asp.

* cited by examiner

AIRCRAFT GALLEY SYSTEMS AND METHODS FOR MANAGING ELECTRIC POWER FOR AIRCRAFT GALLEY SYSTEMS

CROSS-REFERENCE TO RELATED APPLICATION

This is a divisional application of U.S. patent application Ser. No. 10/731,695, filed Dec. 9, 2003, entitled AIRCRAFT GALLEY SYSTEMS AND METHODS FOR MANAGING ELECTRIC POWER FOR AIRCRAFT GALLEY SYSTEMS, which is herein incorporated by reference in its entirety.

TECHNICAL FIELD

The following disclosure relates generally to aircraft galley systems and, more particularly, to systems and methods for managing electrical power for aircraft galley systems.

BACKGROUND

Commercial transport aircraft typically include service galleys for preparing meals and refreshments for passengers and crew. A typical service galley includes a number of electrical appliances or "inserts" such as ovens, coffee makers, trash compactors, and air chillers. Each of the appliances is independently connected to a power feeder that receives electrical power from an aircraft power source. Although most galley appliances operate in a cyclic nature, or for only short periods of time, the electrical power feeder must be sized to support a worst-case load event in which all of the appliances are operating at the same time. Sizing the power feeder for this worst-case scenario results in a relatively heavy and relatively expensive power feeder.

Conventional transport aircraft typically allocate a preset amount of electrical power for galley operations. For example, a typical passenger jet may allocate between 90 and 100 KVA (Kilovolt-Amperes) for such operations. If a particular airline customer selects a suite of galley equipment that could potentially exceed the allocation of electrical power, then interlocks are incorporated into the galley power circuit to prevent an overload. Interlocks are switches that allow flight attendants to make power available to one appliance or one group of appliances, but not another appliance or another group of appliances. In this way, power is available for only a subset of the galley appliances at any given time, thereby preventing the possibility of exceeding the power allocation. One downside of interlocks, however, is that they result in customization of the aircraft galley and additional complexity. Further, they require flight attendants to manually coordinate usage of various galley appliances. Having to manually coordinate appliance usage in this way often impacts the ability of the flight attendants to provide in-flight service in an efficient manner. In addition, this coordination increases flight attendant workload and may increase flight attendant training requirements.

Electric power to galley systems on a conventional jet aircraft is typically cut off when the aircraft experience a significant power shortage. This event is referred to as a "load shed." When power is restored, the galley appliances may or may not, depending on the specific type of appliance, resume operation. One downside associated with load sheds is that flight attendants must guess at how to reset oven timers and other appliance settings to complete food preparation once power has been restored.

Conventional transport aircraft typically use engine bleed air to drive hydraulic pumps, cabin pressurization equipment, anti-ice systems, and other aircraft systems. Running these systems on electric power from the engines, however, instead of engine bleed air may increase the fuel efficiency and thus lower the operating cost of the aircraft. However, increasing the number of aircraft systems using electric power may reduce the amount of electric power available for galley operations. For example, if a typical jet transport aircraft today allocates between 90 and 100 KVA for galley operations, in the future a comparable "more electric" aircraft may only allocate between 40 and 70 KVA for such operations. Accordingly, developing galley systems that use less aircraft power is an important step in the development of fuel efficient "more electric" aircraft.

SUMMARY

The present invention is directed generally toward aircraft power systems and methods and systems for controlling aircraft galley equipment and managing electric power for such equipment. In one embodiment, a method for distributing electric power to a plurality of electrical devices in a vehicle in accordance with one aspect of the invention includes receiving at least a first operating command from a user for at least one of the plurality of electrical devices. In response to receiving the operating command, the method can further include polling the plurality of electrical devices for power requests and receiving at least one power request from the plurality of electrical devices in response to the poll. Power can then be distributed to the electrical devices based on the at least one power request received from the plurality of electrical devices.

In one aspect of this embodiment, receiving the at least one power request from the plurality of electrical devices can include receiving a power request having a quantitative component and a qualitative component. In another aspect of this embodiment, the quantitative component can correspond to an electric load for operating the at least one electrical device, and the qualitative component can correspond to a need for operating the at least one electrical device.

In another embodiment, a method for distributing electric power to a plurality of electrical devices on an aircraft in accordance with another aspect of the invention can include allocating a preset amount of aircraft electric power for operation of the plurality of electrical devices. The method can further include receiving a first power request for operation of a first electrical device and receiving at least a second power request for operation of a second electrical device. The first and second power requests can then be compared, and electric power can be distributed to the first and second electrical devices based on the comparison of the first and second power requests. In this embodiment, the total amount of electric power distributed to the first and second electrical devices does not exceed the preset amount of power originally allocated to the electrical devices.

In another aspect of this embodiment, receiving a first power request for operation of a first electrical device can include receiving a first power request for performance of a first galley operation. Similarly, receiving at least a second power request for operation of a second electrical device can include receiving a second power request for performance of a second galley operation. In this embodiment, comparing the first power request to the second power request can include comparing a first request level associated with the first power request to a second request level associated with the second power request.

In another embodiment, an aircraft system configured in accordance with one aspect of the invention includes an aircraft power source and at least first and second galley appliances operably coupled to the aircraft power source. The aircraft system can further include a controller operably coupled to the first and second galley appliances. The controller can be configured to receive a first power request from the first galley appliance and a second power request from the second galley appliance. The controller can be further configured to sort the first and second power requests and distribute power to the first and second galley appliances from the aircraft power source based on the sorting of the first and second power requests.

In another aspect of this embodiment, the first power request can include a first qualitative component and the second power request can include a second qualitative component. Additionally, the controller can include a processor and a computer-readable medium. The computer-readable medium can include instructions causing the processor to sort the first and second power requests based on a comparison of the first qualitative component from the first power request to the second qualitative component from the second power request.

DETAILED DESCRIPTION

The following disclosure describes various aspects of aircraft galley systems including methods and systems for managing electric power for galley appliances. Certain details are set forth in the following description and in FIGS. 1-8 to provide a thorough understanding of various embodiments of the invention. However, other details describing well-known structures and systems often associated with aircraft and aircraft galley systems are not set forth in the following disclosure to avoid unnecessarily obscuring the description of the various embodiments of the invention.

Many of the details, dimensions, angles, and other features shown in the Figures are merely illustrative of particular embodiments of the invention. Accordingly, other embodiments can have other details, dimensions, and features without departing from the spirit or scope of the present invention. In addition, further embodiments of the invention may be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

Figure 1:
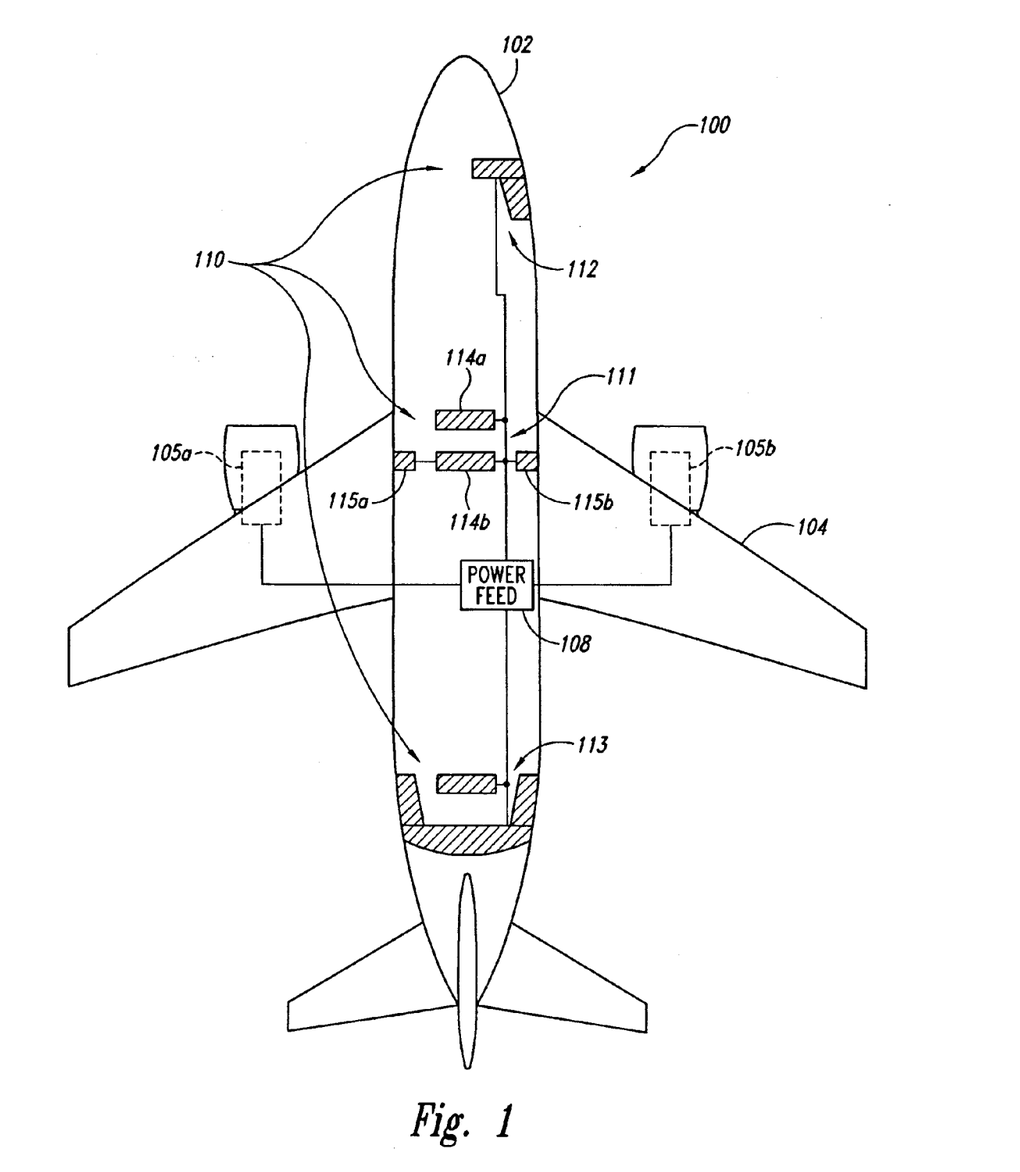
FIG. 1 is a schematic top view of an aircraft having a galley system configured in accordance with an embodiment of the invention.

FIG. 1 is a schematic top view of an aircraft 100 having a galley system 110 configured in accordance with an embodiment of the invention. In one aspect of this embodiment, the aircraft 100 includes a wing 104 extending outwardly from a fuselage 102. Engines 105 (identified individually as a first engine 105a and a second engine 105b) are mounted to the wing 104 and, in addition to providing propulsive thrust to the aircraft 100, can also provide electric power to an aircraft power feed 108.

In another aspect of this embodiment, the galley system 110 includes a plurality of galley complexes positioned within the fuselage 102 that receive electric power from the aircraft power feed 108. In the illustrated embodiment, the galley system 110 includes a first galley complex 111 positioned toward a mid portion of the fuselage 102, a second galley complex 112 positioned toward a forward portion of the fuselage 102, and a third galley complex 113 positioned toward an aft portion of the fuselage 102. The first galley complex 111 can be configured to serve passengers seated in business and economy class sections of the fuselage 102. In addition, the third galley complex 113 can be configured to supplement the service of passengers seated in the economy class section of the fuselage 102. The second galley complex 112 can be configured to serve passengers seated in a first class section of the fuselage 102.

In a further aspect of this embodiment, the first galley complex 111 includes two main equipment suites 114 (identified individually as a first equipment suite 114a and a second equipment suite 114b), and two sidewall equipment suites 115 (identified individually as a left sidewall suite 115a and a right sidewall suite 115b). As described in greater detail below, in one embodiment the main equipment suites 114 can include a number of different electrical appliances for preparation of passenger food and drink. Such appliances can include, for example, ovens, coffee makers, trash compactors, and air chillers. The sidewall equipment suites 115 can include additional electrical appliances, additional counter space, and/or additional storage to facilitate food and beverage preparation.

Although the aircraft 100 of the illustrated embodiment is representative of a passenger aircraft, the present invention is not limited to passenger aircraft. To the contrary, embodiments of the present invention are equally applicable to other types of aircraft, such as freight carriers and other transports having galleys for preparation of crew meals and refreshments. Accordingly, the invention is not limited to passenger aircraft, but extends to other vehicles and other types of aircraft.

Figure 2:
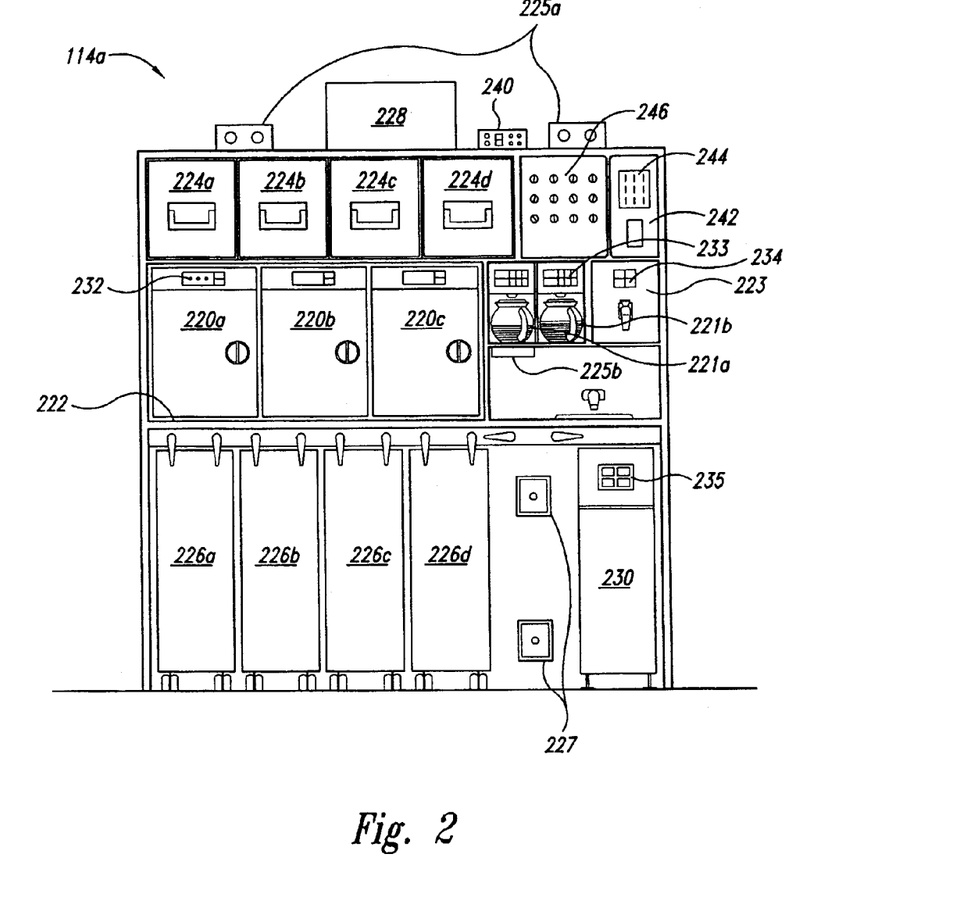
FIG. 2 is an enlarged, front elevation view of a galley equipment suite configured in accordance with an embodiment of the invention.

FIG. 2 is an enlarged, front elevation view of the first equipment suite 114a of FIG. 1 configured in accordance with an embodiment of the invention. In one aspect of this embodiment, the first equipment suite 114a ("equipment suite 114a")

includes a number of electrical appliances for use by flight attendants in preparing and serving in-flight meals and refreshments. These appliances can include, for example, ovens 220a-c, coffee makers 221a-b, and a water boiler 223 positioned above a counter 222. The equipment suite 114a can further include a trash compactor 230 and cold air outlets 227 positioned below the counter 222. Mobile food carts 226a-d are stowed under the counter 222 adjacent to the cold air outlets 227. The food carts 226 include inlets (not shown) configured to be positioned in front of the cold air outlets 227 to receive cold air from an air chiller 228. Lighting for the equipment suite 114a is provided by ceiling lights 225a and a counter light 225b. In addition to the foregoing electrical appliances, the equipment suite 114a can further include a plurality of storage containers 224a-d for storage of food, beverages, and/or serving materials.

In another aspect of this embodiment, many of the electrical appliances in the equipment suite 114a include individual operating controls or user interfaces. For example, each of the ovens 220 can include an oven interface 232, and each of the coffee makers 221 can include a coffee maker interface 233. Similarly, the water boiler 223 can include a boiler interface 234, and the trash compactor 230 can include a compactor interface 235. A control panel 246 can include control switches for those appliances that do not have dedicated user interfaces, such as the air chiller 228 and the lights 225. A circuit breaker panel 242 positioned adjacent to the control panel 246 can include a plurality of circuit breakers 244 corresponding to each of the foregoing electrical appliances.

In a further aspect of this embodiment, the equipment suite 114a includes a controller 240 operably coupled to each of the electrical appliances described above. As described in greater detail below, in one embodiment the controller 240 is configured to receive power requests from the appliances during operation and budget or manage the distribution of power to the appliances in response to the requests. By managing the distribution of electric power to the appliances in this way, the total amount of power used by the galley systems can be significantly reduced. As a result, more power is available for other aircraft systems and the demand on the engines is reduced, thereby increasing fuel efficiency. In addition, reducing the overall power needs of the equipment suite 114a can also allow a reduction in the size and gauge of the corresponding electrical hardware that transmits the power from the aircraft power feed 108 (FIG. 1) to the equipment suite 114a, thereby reducing aircraft weight and further increasing fuel efficiency. As further described in greater detail below, the controller 240 can manage the distribution of electrical power to the appliances in such a way as to not significantly impact the routine food-service operations carried out by the flight attendants during a typical flight.

Figure 3:
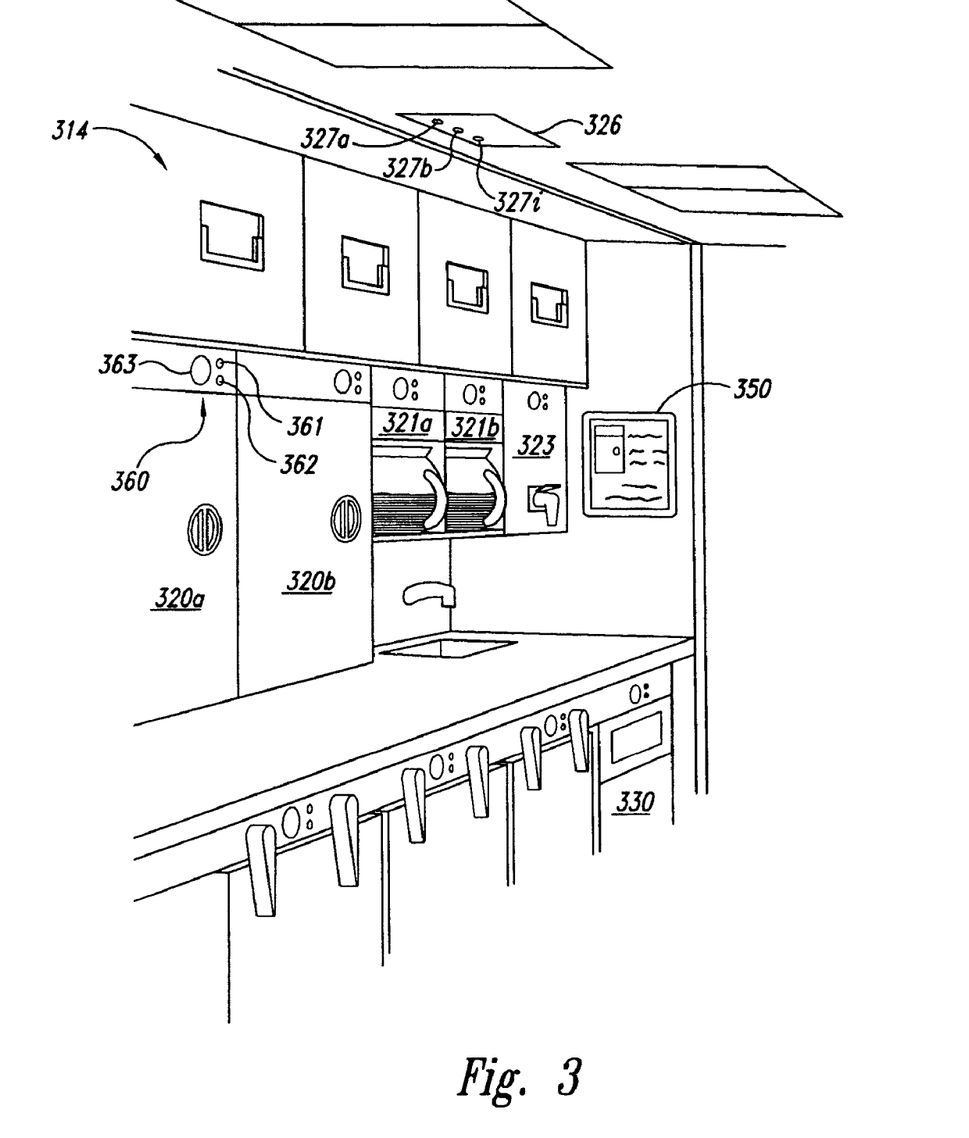
FIG. 3 is an enlarged, front isometric view of a galley equipment suite configured in accordance with another embodiment of the invention.

FIG. 3 is an enlarged, front isometric view of a galley equipment suite 314 configured in accordance with another embodiment of the invention. The equipment suite 314 can include ovens 320a-b, coffee makers 321a-b, a water boiler 323, and a trash compactor 330. These appliances can be at least generally similar in structure and function to the corresponding appliances described above with reference to FIG. 2. In contrast to the appliances described above with reference to FIG. 2, however, the appliances in FIG. 3 lack individual user interfaces having a complete set of operational controls. Instead, the appliances in FIG. 3 include simplified user interfaces to facilitate remote control of the appliances via a display screen 350. For example, each of the ovens 320 can include a simplified user interface 360. The simplified user interface 360 can include a selector 363, a first indicator 361, and a second indicator 362. When a flight attendant desires to use one of the ovens 320, the flight attendant depresses the corresponding selector 363. Doing so causes control information for the particular oven 320 to be displayed immediately on the display screen 350. As explained in greater detail below, the flight attendant can then input the various control settings (i.e., operating commands) for the oven 320 via the display screen 350. In a further embodiment, the flight attendant can depress the selector 363 for a particular period of time to initiate a specific action, such as starting and/or stopping the appliance.

When a particular oven 320 is operating properly, the first indicator 361 can illuminate, indicating normal operation. In one embodiment, flashing of the first indicator 361 can signify that the desired operation is complete (e.g., the warming period is over) or that the desired operation requires the attention of the flight attendant (e.g., the contents of the oven 320 need to be turned). In another embodiment, the second indicator 362 can illuminate to signify that the particular appliance is off or, alternatively, not ready for operation. Additionally, flashing of the second indicator 362 can be used to signify a failure of the particular appliance.

Although the foregoing description of the simplified user interface 360 focused on the ovens 320, each of the other electrical appliances in the equipment suite 314 can include a similar simplified user interface to facilitate control of the appliances via the display screen 350. Accordingly, incorporation of the display screen 350 can eliminate the need for the control panel 246 of FIG. 2. The space normally utilized by the control panel 246 can now be used for additional storage space or for additional galley appliances. Alternatively, eliminating the control panel 246 can make the galley complex smaller and lighter.

In one embodiment, the display screen 350 can include a thin Liquid Crystal Display (LCD) touch-screen or other graphic display device. Having very little depth, the display screen 350 can be mounted on an inside wall of the first galley complex 111 (FIG. 1) and not consume much space. In another embodiment, the display screen 350 can be a "standalone" part not operably connected to other galley complexes. Alternatively, in a further embodiment, the display screen 350 can be combined in function with existing Attendant Control Panels (ACPs) (not shown) or other display screens located elsewhere in the cabin to further reduce costs. In one aspect of this further embodiment, a flight attendant can remotely control or monitor one or more of the appliances in the first galley complex 111 (FIG. 1) from another galley complex (e.g., the second or third galley complexes 112 and 113), an ACP positioned between galley complexes, or a wireless handheld device (not shown). Use of a wireless hand-held device can enable the flight attendant to input operating commands or monitor the operating status of a particular galley appliance when away from the galley complex. Further, in other embodiments, the wireless device can be a device worn by a flight attendant, attached to a galley cart, or otherwise incorporated into a galley cart for access during service.

Although not shown in FIG. 3, in a further aspect of this embodiment, each of the electrical appliances in the equipment suite 314 can be operably coupled to a controller that is at least generally similar in structure and function to the controller 240 described above with reference to FIG. 2. Accordingly, during normal operation of the electrical appliances in FIG. 3, the controller receives power requests from the various appliances and then manages distribution of power to the appliances in a manner that keeps the overall power usage below a preset level while not impacting flight attendant activities.

In another aspect of this embodiment, the equipment suite 314 includes a call-light panel 326 positioned toward a ceiling portion of the galley complex and operably coupled to the display screen 350. The call-light panel 326 can include a plurality of lights 327a-i corresponding to different passenger seating zones, passenger seats, lavatories, and/or other passenger self-serve areas. In one embodiment, the lights 327 on the call-light panel 326 can illuminate when a passenger in a corresponding seat requests the attention of a flight attendant. When this occurs, the flight attendant can access a corresponding display on the display screen 350 to obtain more information about the passenger request (such as a specific seat number), and/or to turn off the call-light before attending to the needs of the passenger.

One feature of the embodiments described above with reference to FIG. 3 is that use of the display screen 350 enables each appliance to have a minimal, low-cost set of controls. Further, the appearance and meaning of the controls can be standardized so that the meaning becomes intuitive at a glance. Another feature of these embodiments is that pressing the selector 363 causes the status information or control menu for that particular appliance to be immediately displayed on the display screen 350. One benefit of this feature is that the selector 363 eliminates the need for the flight attendant to navigate through menus via the display screen 350 to find the particular appliance. Further, this reduces the opportunity for an error such as inadvertently turning on the wrong appliance.

Networking of galley appliances as described above can provide a number of other benefits and opportunities. For example, in one embodiment a first flight attendant can take passenger orders on a wireless hand-held device that automatically transmits the orders to the display screen 350. In this embodiment, a second flight attendant can read the orders and begin preparing them. Further, the orders can direct the second flight attendant as to what food trays should be loaded into what ovens to optimize service. Alternatively, the orders from the wireless hand-held device can be transmitted directly to a particular oven to initiate warming of a particular order. A further benefit of networking in the foregoing manner is that galley inventory can be tracked, and restocking orders can be generated for aircraft caterers before the aircraft has landed. Additionally, a Radio Frequency Identification (RFID) tag can be embedded into food packaging to assist with inventory purposes. In addition to inventory management, RFID technology can also be used to automatically instruct ovens on heating processes and to identify items that should not be heated together in the same oven. Yet another benefit of networking is that it can enable each of the galley appliances to automatically call ahead to ground personnel if service or maintenance is required.

Figure 4A:
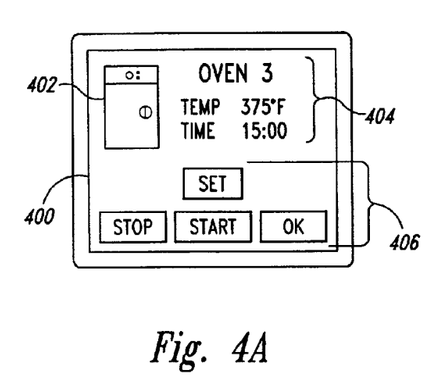
FIG. 4A illustrates a display description configured to receive operating commands for a galley oven in accordance with an embodiment of the invention.
Figure 4B:
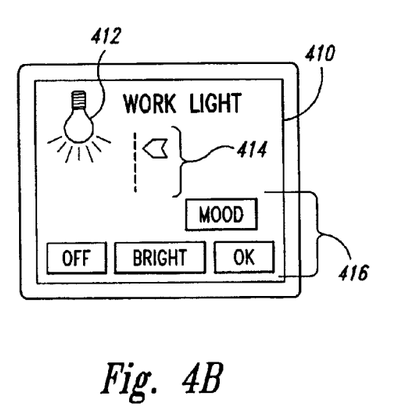
FIG. 4B illustrates a display description configured to receive operating commands for galley lights in accordance with an embodiment of the invention.
Figure 4C:
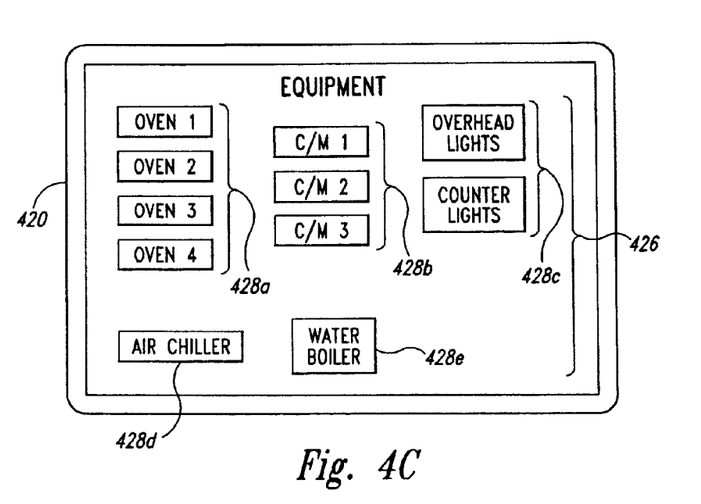
FIG. 4C illustrates a display description configured to receive an appliance selection in accordance with an embodiment of the invention.

FIGS. 4A-C are diagrams illustrating text and graphics that can be displayed on the display screen 350 of FIG. 3 for operating one or more of the appliances in the equipment suite 314 in accordance with embodiments of the invention. FIG. 4A, for example, illustrates a display description 400 for operating one of the ovens 320. In one aspect of this embodiment, the display description 400 includes an oven identifier icon 402, operating parameter fields 404, and touch-pad controls 406. The touch-pad controls. 406 can include a plurality of touch-keys for starting and stopping the oven and setting or changing the values displayed in the operating parameter fields 404. The operating parameters can include time and temperature.

FIG. 4B illustrates a display description 410 for controlling the lighting in the galley complex. In one aspect of this embodiment, the display description 410 includes a light icon 412 providing a quick visual identifier of the appliance being controlled. The display description 410 can further include a brightness indicator 414 and a touch-pad 416 that includes a plurality of touch-keys for controlling the light setting.

FIG. 4C illustrates a display description 420 for selecting an electrical appliance in the equipment suite 314 to control. In one aspect of this embodiment, the display description 420 can be used by a flight attendant to remotely select one of the appliances without having to depress the selector 363 (FIG. 3) associated with the particular appliance. In the illustrated embodiment, the display description 420 includes a list 426 of those appliances that can be remotely controlled via the display screen 350. The list 426 can include a touch-key associated with each appliance, including, for example, oven touch-keys 428a, coffee maker touch-keys 428b, overhead and counter light touch-keys 428c, an air chiller touch-key 428d, and a water boiler touch-key 428e. When a flight attendant desires to operate one of the corresponding appliances, the flight attendant merely selects the corresponding touch-key to bring up a display description corresponding to that particular appliance. For example, if the flight attendant selects one of the oven touch-keys 428a, a display description similar to the display description 400 illustrated in FIG. 4A is then displayed. In this manner, the flight attendant can remotely program and/or operate one or more of the appliances in the equipment suite 314 from the display screen 350 without having to move from appliance to appliance.

In another embodiment similar to the embodiment illustrated in FIG. 4C, a display description can include a schematic diagram of a galley equipment suite with symbols and/or other identifiers identifying the various appliances. The symbols can be arranged in the display description in a way that intuitively reflects the relative locations of the appliances in the aircraft. In this embodiment, when a flight attendant desires to operate one of the appliances, the flight attendant merely selects the symbol corresponding to the particular appliance to bring up a display description for controlling the appliance.

Figure 5:
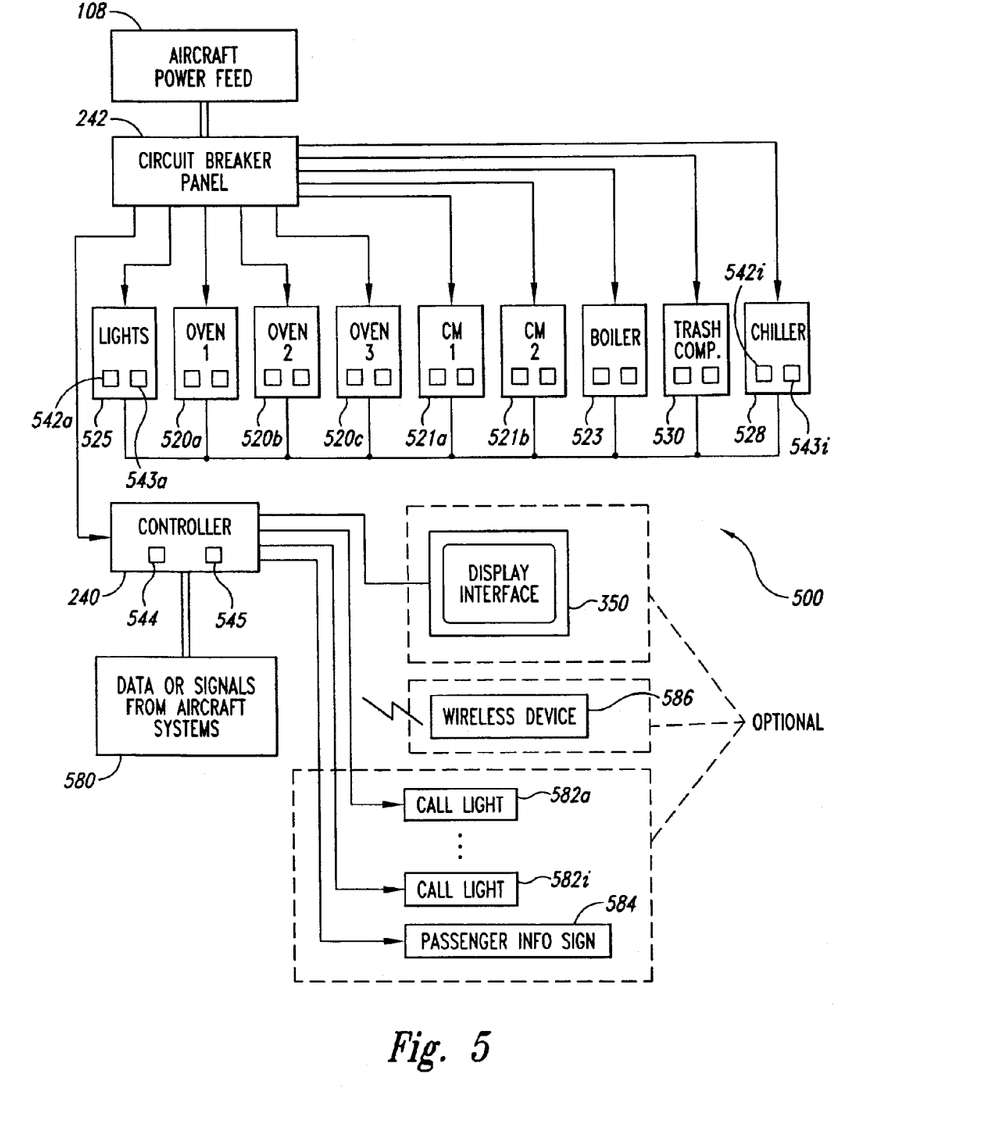
FIG. 5 is a schematic diagram of a galley system configured in accordance with an embodiment of the invention.

FIG. 5 is a schematic diagram of a galley system 500 configured in accordance with an embodiment of the invention. In one aspect of this embodiment, the galley system 500 includes the controller 240 and the circuit breaker panel 242 described above with reference to FIG. 2. The circuit breaker panel 242 receives electric power from the aircraft power feed 108 and can provide power to a plurality of galley appliances as directed by the controller 240. The controller 240 receives operating power from the circuit breaker panel 242 and is operably coupled to each of the galley appliances. The galley appliances can include, for example, ovens 520a-c, coffee makers 521a-b, a water boiler 523, a trash compactor 530, an air chiller 528, and lights 525.

For those equipment suites that include the display screen 350 for remote control of galley appliances (such as the equipment suite 314 of FIG. 3), the controller 240 can be operably coupled to the display screen 350 to receive appliance operating commands from a flight attendant or other user. Conversely, for those equipment suites that lack the display screen 350 and instead include individual user interfaces on each of the appliances (such as the equipment suite 114a of FIG. 2), each of the appliances can receive such operating commands directly from the user.

In another aspect of this embodiment, each of the galley appliances listed above can include a memory 543 (identified individually as memories 543a-i) for storing computer-readable instructions, a processor 542 (identified individually as processors 542a-i) for executing the instructions stored in the memory 543, and a controller interface (not shown) for operably connecting to the controller 240. As described in greater detail below, in one embodiment the instructions stored in the memory 543 can enable the processor 542 to generate power requests that are sent to the controller 240 requesting power for operation. The controller 240 can include a controller processor 544 for executing computer-readable instructions stored in a memory 545. As further described in detail below, in another embodiment the instructions stored in the memory 545 can enable the controller processor 544 to respond to power requests from the appliances by budgeting the distribution of power to the appliances. The power can be budgeted in such a way that the total amount of power used by the galley equipment does not exceed the preset amount of power allocated to the galley by the aircraft power feed 108.

The galley system 500 is operable in at least two different embodiments. In a first embodiment corresponding to FIG. 2, one or more of the galley appliances (i.e., the ovens 520, the coffee makers 521, the water boiler 523, the trash compactor 530, the air chiller 528, and/or the lights 525) includes an individual user interface configured to receive operating commands from a user. In this embodiment, flight attendants can turn on the individual appliances and set the operating parameters as needed with the user interfaces. In response to being turned on, the appliances can generate power requests that are transmitted to the controller 240. In one embodiment described in greater detail below, the power requests can have two components. The first component is a quantitative component corresponding to the amount of power or "load" the appliance currently requires to comply with the operating command from the flight attendant. The second component is a qualitative component corresponding to the level or the "request level" at which the appliance currently needs the power to comply with the operating command. Upon receiving the power requests from the respective appliances, the controller 240 can compare and sort the requests in descending order based on the request level. The controller 240 can then distribute power to the appliances, starting at the top of the list, until all of the allocated power has been distributed. In this way, the controller 240 does not exceed the preset amount of power allocated to the galley by the aircraft power feed 108. If, as a result of having a lower request level, a particular appliance does not receive the power it requested, that appliance can automatically adjust future power requests to ensure that the end result desired by the flight attendant is ultimately met.

In a second embodiment corresponding to FIG. 3, one or more of the galley appliances lacks an individual user interface for receiving operating commands from a flight attendant. In this embodiment, the flight attendant inputs operating commands for such appliances via the display screen 350. Upon receiving the various operating commands via the display screen 350, the respective appliances generate power requests that are transmitted to the controller 240 as described above. The controller 240 responds to the power requests by comparing and sorting them in descending order of request level and distributing power to the appliances accordingly. In either of the two operating embodiments described above for the galley system 500, a wireless hand-held device 586 can be used to exchange information with the controller 240. Such information can include user operating commands sent from the wireless device 586 to the controller 240 via, for example, the display screen 350, as well as operational status information sent from the various galley appliances to the wireless device 586 via, for example, the controller 240.

In each of the foregoing embodiments, the appliances can submit more than one request for multiple loads. For example, the ovens 520 may require one load for heating elements and a separate load for convection fans. Similarly, the air chiller 528 may require one load for a compressor and another load for a blower. Further, the coffee makers 521 can include tank heaters, hot plates (under a carafe), and brew solenoids that all require separate loads.

In addition, in each of the foregoing embodiments, the operating commands for the various appliances originate from a flight attendant or other user. The present invention, however, is not limited to such embodiments. In other embodiments, operating commands for the various appliances as well as other electrical equipment can be automatically generated and transmitted to the appliances/equipment. For example, in one such embodiment, operating commands can be automatically generated when an aircraft takes off, or at another preselected time during a flight. Such automatic commands can be generated by a flight computer or other programmable device. Alternatively, such commands can be generated by a ground station and wirelessly transmitted to the aircraft.

As explained above, in one embodiment each of the galley appliances can be configured to transmit power requests as needed for operation to the controller 240. The power request can have two components: a load and a request level. Table 1 below illustrates a scheme for power request levels in accordance with one embodiment of the invention.

TABLE 1

| Request Level | Description |
| --- | --- |
| 7 | Needs constant power or short-term power to support an operating command |
| 6 | Strongly needs power |
| 5 | Needs power |
| 4 | Ready to start |
| 3 | Wants power |
| 2 | Boost |
| 1 | No power |
| 0 | Off |

In one aspect of this embodiment, request level 7 indicates that the associated appliance needs constant power or short-term power to support a particular user operating command. Such a level may be appropriate in at least two different circumstances. The first circumstance may be where the appliance does not cycle and maintaining the requested load is very important or essential to performing the desired operation. One example of a level 7 power request is a forced convection fan within an oven that must be kept operational at all times when the oven is operating to ensure consistent food quality. The second circumstance in which a level 7 power request may be appropriate is when a particular operation requires timely initiation. For example, if a flight attendant turns on the trash compactor 530, he or she may not want to wait for it to operate. Similarly, in selected embodiments a level 7 power request may be appropriate for an activity like brewing coffee.

In another aspect of this embodiment, a level 6 power request can correspond to a power request from cyclic equipment, such as one of the ovens 520, that is currently significantly below normal operating temperature. For example, in one embodiment the ovens 520 can issue level 6 power requests if the temperature is more than about 60 degrees below the set temperature. In this embodiment, the level 6 power request would help minimize time at low operating temperatures and improve food quality. In a further aspect of this embodiment, a level 5 power request can be similar to the level 6 request but, in the oven example, can be used when the current temperature is below normal operating temperature but not as far below as a level 6 request. For example, in one embodiment the ovens 520 can issue level 5 power requests if the temperature is between about 20 to about 60 degrees below the set temperature.

In yet another aspect of this embodiment, a level 4 power request can correspond to an appliance being initially turned on. In this embodiment, the level 4 power request indicates that the appliance is ready to start operating. If power is denied, the request level remains at level 4 and the timer associated with the appliance will not run. Once power is granted to the appliance, the appliance submits subsequent power requests at other request levels as appropriate.

In a further aspect of this embodiment, a level 3 power request may be appropriate when the actual temperature (staying with the oven example) is close to the set temperature but still below the set temperature. For example, in one embodiment the ovens 520 can issue level 3 power requests if the temperature is less than about 20 degrees below the set temperature. Ideally, in this embodiment, a level 3 request maintains the temperature of the oven with normal cycling.

In yet another aspect of this embodiment, a level 2 power request may be appropriate when the oven temperature is above the set temperature. For example, in one embodiment the ovens 520 can issue level 2 power requests if the oven temperature is less than about 30 degrees above the set temperature. Although normally an oven would be cycled off at this temperature, it may be advantageous to request additional power if available at this time so that the oven can "boost" the temperature in preparation for future periods where power may be unavailable. In this embodiment, the controller 240 may provide power to the appliance if it is available and the controller 240 determines that there could be a shortage of power soon. In such an event, the oven is boosted to help it get through the next power shortage. This boosting can also be used to de-synchronize oven cycles between two or more of the ovens 520.

In a further aspect of this embodiment, a level 1 power request may be appropriate if the oven temperature is excessively high such that the food could be burned. For example, in one embodiment the ovens 520 can issue level 1 power requests if the oven temperature is greater than about 30 degrees above the set temperature. If such a level is requested, the controller 240 will not grant power to the appliance but instead will use the information in considering whether other equipment should be boosted.

In yet another aspect of this embodiment, a level 0 power request may be appropriate if the corresponding appliance is functionally "OFF" or otherwise not operational. In this scenario, power is not needed by the appliance and the controller 240 will not grant power to the appliance. Further, the controller 240 will not take the appliance into consideration when determining the power budget for the equipment suite.

As those of ordinary skill in the art will appreciate, the foregoing request levels are merely illustrative of one particular embodiment of the invention. Accordingly, in other embodiments, more or fewer request levels having other associated parameters can be employed to manage distribution of electrical power to galley appliances and other equipment.

The galley system 500 can compensate for an electric load shed and maintain food quality in one embodiment as follows. Such a load shed may occur, for example, in a situation where the aircraft needs a substantial portion of the available electric power for an in-flight engine restart. In such a situation, a bus power control unit 580 sends a signal to the controller 240 indicating that the amount of power available for galley operations will be reduced to a particular level. In response, the controller 240 denies power to at least some of the galley appliances, such as those drawing the most power. At all times, however, each appliance continues to draw at least enough power so that the associated processor 542 can track the status of the operation the appliance was performing.

When power to the appliance is resumed, the processor 542 automatically adjusts the associated device timer to compensate for the period in which power was denied. In the case of one of the ovens 520, for example, the timer would increase the cooking period and/or temperature to provide the desired result. Conversely, if a power boost to the particular appliance is available, then the timer would decrease the cooking time and/or temperature. The processor 542 can determine the actual cooking time based on the desired final food temperature and can adjust the time based on essentially any load shed and/or power boost scenario. In contrast, when conventional aircraft experience a load shed, the appliances must be manually reset in order to complete the operations they were performing.

In a further embodiment, the controller 240 can be used in conjunction with remote-control circuit breakers (not shown) that replace the circuit breaker panel 242 described above with reference to FIGS. 2 and 5. Thus, physical access to circuit breakers is no longer required in this embodiment. In addition, the remote-control circuit breakers can be located in an overhead space or other out-of-the-way space that is not visible from the aircraft cabin. Locating the remote-control circuit breakers in this manner can increase cabin space and improve the appearance.

If the controller 240 is linked with other components of an aircraft data network, then it can also be used to drive call-lights, passenger information signs, oxygen drops, or other equipment from within a galley complex. For example, in yet another aspect of this embodiment, the controller 240 can be operably coupled to a plurality of call-lights 582*a-i* and one or more passenger information signs 584. If a passenger calls a flight attendant using one of the call-lights 582, a corresponding signal or message can be displayed on the display screen 350 summoning a flight attendant to the corresponding passenger seat. In another embodiment, a flight attendant can select a particular type of graphics or text for the passenger information sign 584 via the display screen 350, and then cause the message to be displayed by selecting an appropriate touch-key on the display screen 350.

Traditionally, aircraft include customized wiring to support appliances and other electrical equipment. In contrast, a network system such as that described above with reference to FIG. 5 that networks the appliances and other electrical items to the controller 240 can allow the electrical interface with the aircraft and the aircraft-side wiring to be more standardized and less extensive, reducing non-recurring costs for engineering and manufacturing. Further, with the addition of the display screen 350, the controller 240 can serve as a centralized user interface for the entire galley system 110 (FIG. 1). In such embodiments, the display screen 350 replaces the individual controls and displays on each galley appliance, thereby reducing the cost of each appliance and improving the space-efficiency and overall appearance of the galley complex.

Figure 6:
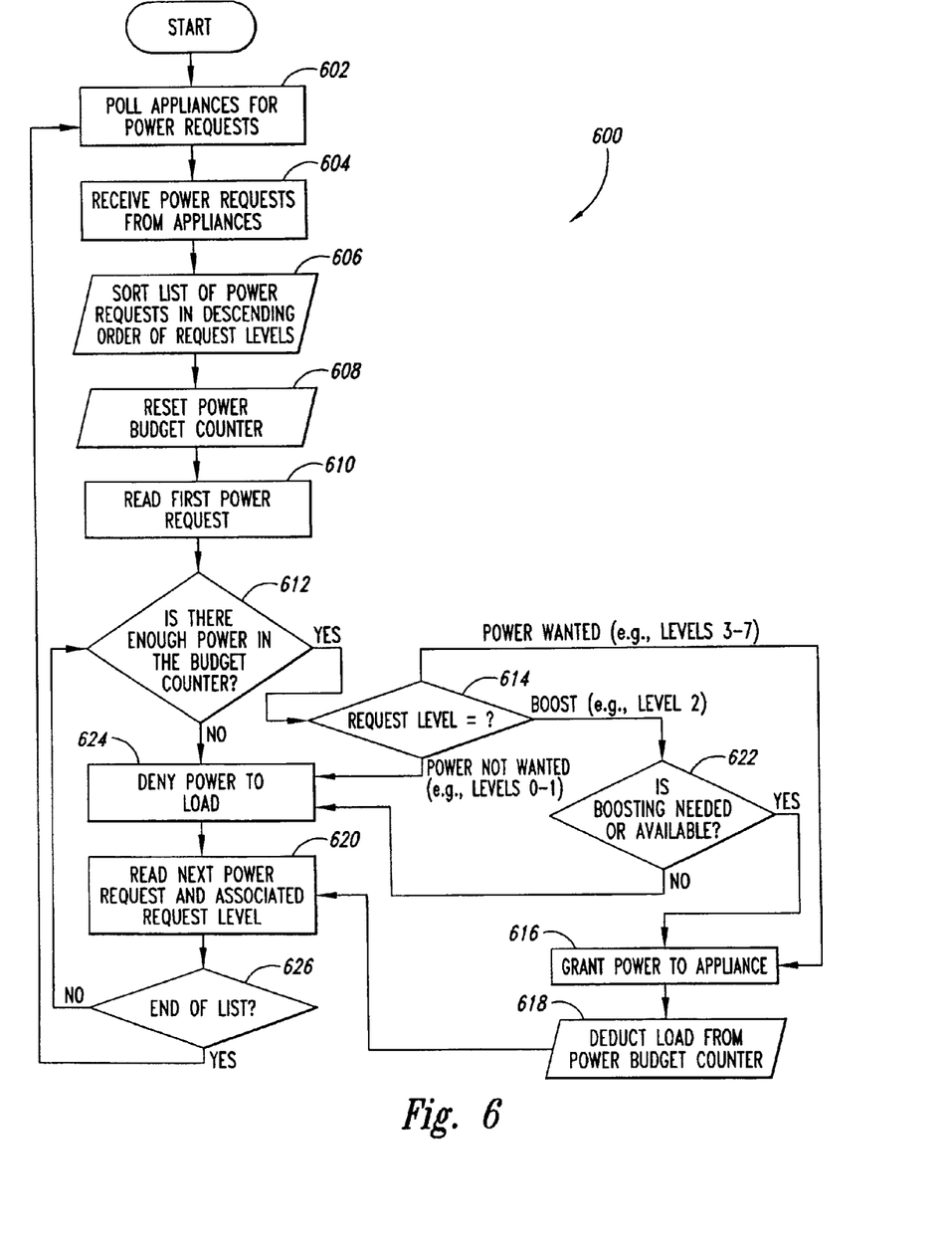
FIG. 6 is a flow diagram illustrating a routine for managing the distribution of power to galley appliances in accordance with an embodiment of the invention.

FIG. 6 is a flow diagram of a routine 600 for managing the distribution of power to galley appliances in accordance with an embodiment of the invention. In one aspect of this embodiment, the routine 600 can be implemented by the controller processor 544 of FIG. 5 in accordance with computer-readable instructions stored on the controller memory 545. In other embodiments, the routine 600 can be implemented by other devices to control appliances and/or other types of electrical equipment in aircraft and other vehicles.

In another aspect of this embodiment, the routine 600 starts when a flight attendant or other user inputs operating commands to one or more of the galley appliances or otherwise turns the appliance "ON." In another embodiment, the routine 600 can be running constantly as long as the controller 540 is operational. In block 602, the routine 600 polls the appliances for power requests. As discussed above, each power request can include a quantitative portion or "load," and a qualitative portion or "request level." In block 604, the routine 600 receives power requests from the appliances in response to the poll. In block 606, the routine 600 sorts the power requests in descending order based on the request levels (e.g., levels 7-0). In one embodiment, the routine 600 can compare the power requests to each other first to ascertain the respective request levels before sorting them according to request level.

In block 608, the routine 600 resets a power budget counter to the full amount of electric power allocated to the galley equipment at that particular point in time. For example, in one embodiment the aircraft power system may normally set the galley power budget at about 70 KVA. However, at a particular point in time, the aircraft power system may change the galley power budget to a lesser amount, such as about 40 KVA, to conserve power for other operations or for other reasons.

After the power budget counter has been reset, in block 610, the routine 600 reads the first power request from the sorted list of power requests. In decision block 612, the routine 600 determines if there is enough power in the power budget to supply the load in the first power request. If so, then the routine 600 proceeds to decision block 614 to determine the request level of the first power request. As discussed above, in one embodiment there are eight different levels of power request (i.e., levels 0-7) corresponding to different levels of need. If the request is a "power wanted" request (i.e., a level 3-7 request), then the routine 600 proceeds to block 616 and grants power to the appliance at the requested load.

If, instead, the request is a "boost" request (i.e., a level 2 request), then the routine 600 proceeds to decision block 622 to determine if boosting of the appliance is needed and/or if sufficient power for boosting is available. If sufficient power for boosting is not available and/or boosting is not needed, then the routine 600 proceeds to block 624 and denies power to the requesting appliance. Alternatively, if power to boost the appliance is available and/or needed, then the routine 600 proceeds to block 616 and grants power to the requesting appliance. After power is granted to a requesting appliance in block 616, the routine 600 proceeds to block 618 and decrements the power budget accordingly. The routine 600 then proceeds to block 620 and reads the next power request in descending order.

Returning to decision block 614, if the power request is a "power not wanted" request (i.e., a level 0 or 1 request), then the routine 600 proceeds to block 624 and denies power to the requesting appliance. After power to the appliance has been denied, the routine 600 proceeds to block 620 and reads the next power request from the list in descending order. In decision block 626, the routine 600 determines if there are any more requests in the list of power requests. If there are no more requests in the list, then the routine 600 returns to decision block 602 and repeats. In one embodiment, the routine 600 can repeat periodically, for example, on approximately one or two second intervals.

Conversely, if the routine 600 is not at the end of the request list, then from decision block 626 the routine 600 proceeds to decision block 612 and determines if there is enough power in the budget to fulfill the load associated with the next power request. From this point, the routine 600 repeats as described above until each power request in the sorted list of power requests has been met or denied and/or the amount of power in the power budget has been One feature associated with the routine 600 described above is that a plurality of galley appliances can be operated without exceeding a preset power budget. One benefit of this feature is that the amount of electric power can be set at a relatively low level, resulting in a lighter electric power system and greater aircraft fuel efficiency. Another feature associated with the routine 600 is that although the overall power level may be preset to a relatively low level, the appliances can still perform their particular operations without impacting flight attendant operations such as the preparation of food and beverages. As explained above, this feature is implemented by the appliance processors that can adjust the timers and operating programs for the respective appliances to accommodate interruptions or reductions in electric power. One advantage of this feature is that the galley appliances can be operated at a lower power level, thereby conserving aircraft power, while at the same time not impacting flight attendant operations in a way that would result in poor passenger service.

Figure 7:
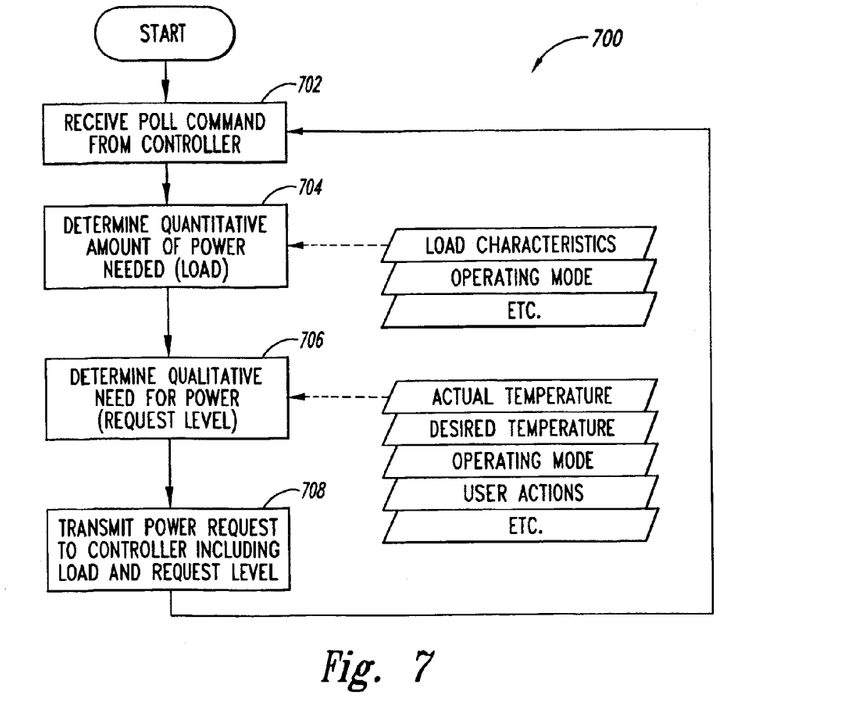
FIG. 7 is a flow diagram illustrating a routine for generating a power request for an appliance in accordance with an embodiment of the invention.

FIG. 7 is a flow diagram of a routine 700 for generating a power request in accordance with an embodiment of the invention. In one aspect of this embodiment, the routine 700 can be implemented by the appliance processors 542 operating on the respective galley appliances. In other embodiments, such a routine can be implemented by other electrical devices in aircraft and other vehicles. In block 702, the routine 700 is polled by the controller 240 for one or more power requests. In block 704, the routine 700 responds to the poll by determining the amount of power needed (i.e., the load) to comply with a particular operating command from a flight attendant or other user. The appliance can make this determination based on a number of factors including, for example, the desired operating mode, the load characteristics, etc.

In block 706, the routine 700 determines the qualitative need for the power (i.e., the request level of the power request). The appliance can determine the request level based on a number of factors including, in the case of an oven, the actual temperature of the oven, the desired temperature, the particular operating mode, user actions, etc. After determining the two components of the power request, the routine 700 proceeds to block 708 and transmits the power request to the controller 240. As discussed above with reference to FIG. 6, in one embodiment the controller 240 can periodically issue poll commands to the appliances. Accordingly, in this embodiment, the routine 700 returns to block 702 after completing block 708 and waits for the next poll command from the controller 240.

In the embodiment described above with reference to FIGS. 6 and 7, the controller 240 issues a poll command to the appliances, and the appliances respond by generating power requests that are transmitted back to the controller 240. In another embodiment, however, the controller 240 can perform all of these functions. In this other embodiment, the controller 240 receives the operating commands from the flight attendant and unilaterally determines the appropriate power request for each of the corresponding appliances. The controller 240 then manages the distribution of electrical power to the respective appliances in accordance with, for example, the routine 600 described above with reference to FIG. 6. Accordingly, one benefit of this particular embodiment may be that the galley appliances can be made somewhat simpler by not including either the appliance processor 542 or the memory 543. In a further embodiment that is slightly different from the embodiment described above with reference to FIGS. 6 and 7, the appliances can automatically generate and transmit power requests to the controller 240 immediately after being turned on and without being polled or prompted by the controller 240.

Figure 8:
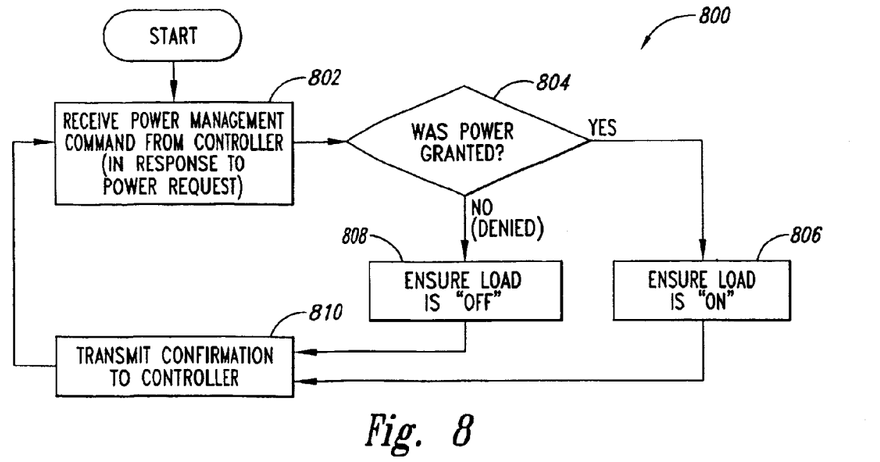
FIG. 8 is a flow diagram illustrating a routine for responding to a power management command from a controller in accordance with an embodiment of the invention.

FIG. 8 is a flow diagram of a routine 800 for responding to a power management command from the controller 240. In one aspect of this embodiment, the routine 800 can be implemented by the appliance processors 542 operating on the various galley appliances. In block 802, the routine 800 receives a power management command from the controller 240 in response to sending the controller 240 a power request. In decision block 804, the routine 800 determines if the power request was granted. If the power request was granted, then in block 806 the routine ensures that the power to the appliance is "ON." Alternatively, if power to the appliance was denied by the controller 240, then in block 808 the routine ensures that power to the appliance is "OFF." After performing either block 806 or 808, the routine 800 proceeds to block 810 and transmits a confirmation to the controller 240 that the power management command was complied with. The routine 800 then returns to block 802 and repeats.

The term "processor" as generally used herein refers to any logic processing unit, such as one or more central processing units (CPUs), digital signal processors (DSPs), application-specific integrated circuits (ASIC), etc. While the processors and memories discussed above are shown as separate blocks, some or all of these blocks can be monolithically integrated onto a single chip. Further, while many of the embodiments are shown and described as being implemented in hardware (e.g., one or more integrated circuits designed specifically for a task), such embodiments could equally be implemented in software and be performed by one or more processors. Such software can be stored on any suitable computer-readable medium, such as microcode stored in a semiconductor chip, on a computer-readable disk, or downloaded from a server and stored locally at a client.

Certain embodiments of the invention have been described above in the general context of computer-executable instructions, such as program modules being executed by a general purpose computer. Those skilled in the relevant art will appreciate that the invention can be practiced with other computer system configurations, including Internet appliances, handheld devices, multiprocessor systems, microprocessor-based or programmable consumer electronics, network PCs, mini computers, mainframe computers, and the like. The invention can be embodied in a special purpose computer or data processor that is specifically programmed, configured or constructed to perform one or more of the computer-executable instructions explained in detail above. The invention can also be practiced in distributed computing environments where tasks or modules are performed by remote processing devices, which are linked through a communications network. In a distributed computing environment, program modules may be located in both local and remote memory storage devices.

From the foregoing, it will be appreciated that specific embodiments of the invention have been described herein for purposes of illustration, but that various modifications may be made without deviating from the spirit and scope of the invention. For example, although the foregoing disclosure includes descriptions of methods and systems for managing the distribution of power to galley appliances on aircraft, in other embodiments of the invention, similar methods and systems can be employed to manage the distribution of power to other aircraft systems. For example, in one other embodiment, such methods and systems can be employed to manage the distribution of power to in-flight entertainment systems or other passenger-related systems, such as in-seat personal computers and telephones. In further embodiments, such methods and systems can be employed to manage the distribution of power to certain aircraft flight systems, such as nonessential flight systems. In yet other embodiments, the methods and systems described above can be used in vehicles other than aircraft, such as boats, buses, cars, and trains, to name a few. Accordingly, the invention is not limited except as by the appended claims.

I claim:

1. An aircraft system comprising:
    an aircraft power source;
    at least first and second galley appliances operably coupled to the aircraft power source and configured to receive electric power from the aircraft power source; and
    a controller operably coupled to the first and second galley appliances, wherein the controller is configured to receive a first power request from the first galley appliance and a second power request from the second galley appliance, wherein the first power request includes a first quantitative component and a first qualitative component, wherein the second power request includes a second quantitative component and a second qualitative component, and wherein the controller is further configured to sort the first and second power requests and distribute power to the first and second galley appliances from the aircraft power source based on a comparison of the first and second qualitative components.

2. The aircraft system of claim 1 wherein the aircraft power source includes a jet engine configured to provide propulsive thrust, and wherein the aircraft system further comprises a fuselage having a passenger cabin, the jet engine providing electric power for pressurization of the passenger cabin in the absence of providing engine bleed air for air conditioning of the passenger cabin.

3. The aircraft system of claim 1 wherein the controller includes a processor and a computer-readable medium, wherein the computer-readable medium includes instructions causing the processor to sort the first and second power requests based on relative need.

4. The aircraft system of claim 1 wherein the controller includes a processor and a computer-readable medium, the computer-readable medium including instructions causing the processor to sort the first and second power requests based on a comparison of the first and second qualitative components.

5. An aircraft system comprising:
    an aircraft power source;
    at least first and second galley appliances operably coupled to the aircraft power source and configured to receive electric power from the aircraft power source; and
    a controller operably coupled to the first and second galley appliances, wherein the controller is configured to receive a first power request from the first galley appliance and a second power request from the second galley appliance, wherein the first power request includes a first quantitative component and a first qualitative component, wherein the second power request includes a second quantitative component and a second qualitative component, and wherein the controller includes a processor and a computer-readable medium, the computer-readable medium including instructions causing the processor to sort the first and second power requests based on a comparison of the first and second qualitative components and distribute power to the first and second galley appliances from the aircraft power source based on the sorting of the first and second power requests.

6. The aircraft system of claim 1, further comprising an equipment suite including at least the first and second galley appliances, wherein the aircraft power source provides a preset amount of electric power to the equipment suite, and wherein the controller is further configured to decrease the electric power provided to at least one of the first and second galley appliances when the power needs of the equipment suite exceed the preset amount of electric power provided by the aircraft power source.

7. The aircraft system of claim 1 wherein the first galley appliance includes a first user interface and the second galley appliance includes a second user interface, wherein the first and second user interfaces are operably coupled to the controller and configured to transmit operating commands for the first and second appliances to the controller in response to user inputs.

8. The aircraft system of claim 1, further comprising a user interface separate from the first and second galley appliances, wherein the user interface is operably coupled to the controller and configured to transmit operating commands for the first and second appliances to the controller in response to user inputs.

9. The aircraft system of claim 1 further comprising a fuselage; wherein the first and second galley appliances are positioned within the fuselage.

* * * * *